United States Patent
Ide et al.

(10) Patent No.: US 8,444,948 B2
(45) Date of Patent: May 21, 2013

(54) GRAPHITE NANO-CARBON FIBER AND METHOD OF PRODUCING THE SAME

(75) Inventors: Katsuki Ide, Chigasaki (JP); Tetsuya Mine, Chiba (JP); Jun Yoshikawa, Chigasaki (JP); Tsuyoshi Noma, Yokohama (JP); Masao Kon, Yokohama (JP); Kazutaka Kojo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/204,538

(22) Filed: Aug. 5, 2011

(65) Prior Publication Data

US 2012/0213691 A1 Aug. 23, 2012

(30) Foreign Application Priority Data

Feb. 18, 2011 (JP) ................... 2011-033724

(51) Int. Cl.
*D01C 5/00* (2006.01)

(52) U.S. Cl.
USPC ............. 423/447.3; 423/447.1; 422/146; 977/843

(58) Field of Classification Search
USPC . 423/447.1, 447.3, 445 B, DIG. 40; 977/742, 977/842, 843; 422/129, 186–186.3
See application file for complete search history.

(56) References Cited

U.S. PATENT DOCUMENTS

| | | | | |
|---|---|---|---|---|
| 5,413,773 | A * | 5/1995 | Tibbetts et al. | 423/447.3 |
| 6,455,021 | B1 | 9/2002 | Saito | |
| 2008/0014431 | A1 * | 1/2008 | Lashmore et al. | 428/315.5 |
| 2010/0150815 | A1 * | 6/2010 | Aguilar Elguezabal et al. | 423/447.1 |
| 2010/0247419 | A1 | 9/2010 | Nguyen | |
| 2010/0278715 | A1 * | 11/2010 | Khe | 423/447.1 |

FOREIGN PATENT DOCUMENTS

| | | |
|---|---|---|
| EP | 1524242 A2 * | 4/2005 |
| JP | 61-146816 | 7/1986 |
| JP | 64-021980 U | 2/1989 |
| JP | 04-241118 | 8/1992 |
| JP | 10-273308 A2 | 10/1998 |
| JP | 2000-086217 A2 | 3/2000 |
| JP | 2000-095509 A1 | 4/2000 |
| JP | 2001-288625 | 10/2001 |
| JP | 2003-342840 A2 | 12/2003 |
| JP | 2004-068187 | 3/2004 |

(Continued)

OTHER PUBLICATIONS

Office Action received in Japanese Patent Application No. 2011-033724, mailed on Jan. 8, 2013.

(Continued)

*Primary Examiner* — Stanley Silverman
*Assistant Examiner* — Richard M Rump
(74) *Attorney, Agent, or Firm* — Knobbe Martens Olson & Bear LLP

(57) ABSTRACT

According to one embodiment, there is provided a graphite nano-carbon fiber provided by using an apparatus having a reactor capable of keeping a reducing atmosphere inside thereof, a metal substrate arranged as a catalyst in the reactor, a heater heating the metal substrate, a pyrolysis gas source supplying pyrolysis gas obtained by thermally decomposing a wood material in a reducing atmosphere to the reactor, a scraper scraping carbon fibers produced on the metal substrate, a recovery container recovering the scraped carbon fibers, and an exhaust pump discharging exhaust gas from the reactor. The carbon fibers are linear carbon fibers with a diameter of 25 to 250 nm formed with layers of graphenes stacked in a longitudinal direction.

7 Claims, 10 Drawing Sheets

FOREIGN PATENT DOCUMENTS

| | | |
|---|---|---|
| JP | 2007-070166 | 3/2007 |
| JP | 2010-013319 | 1/2010 |
| JP | 2010-042934 | 2/2010 |
| JP | 2010-052957 | 3/2010 |
| WO | WO 2010/016395 | 2/2010 |

OTHER PUBLICATIONS

Office Action received in counterpart Korean Patent Application No. 10-2011-0074519, dated Feb. 21, 2013.

* cited by examiner

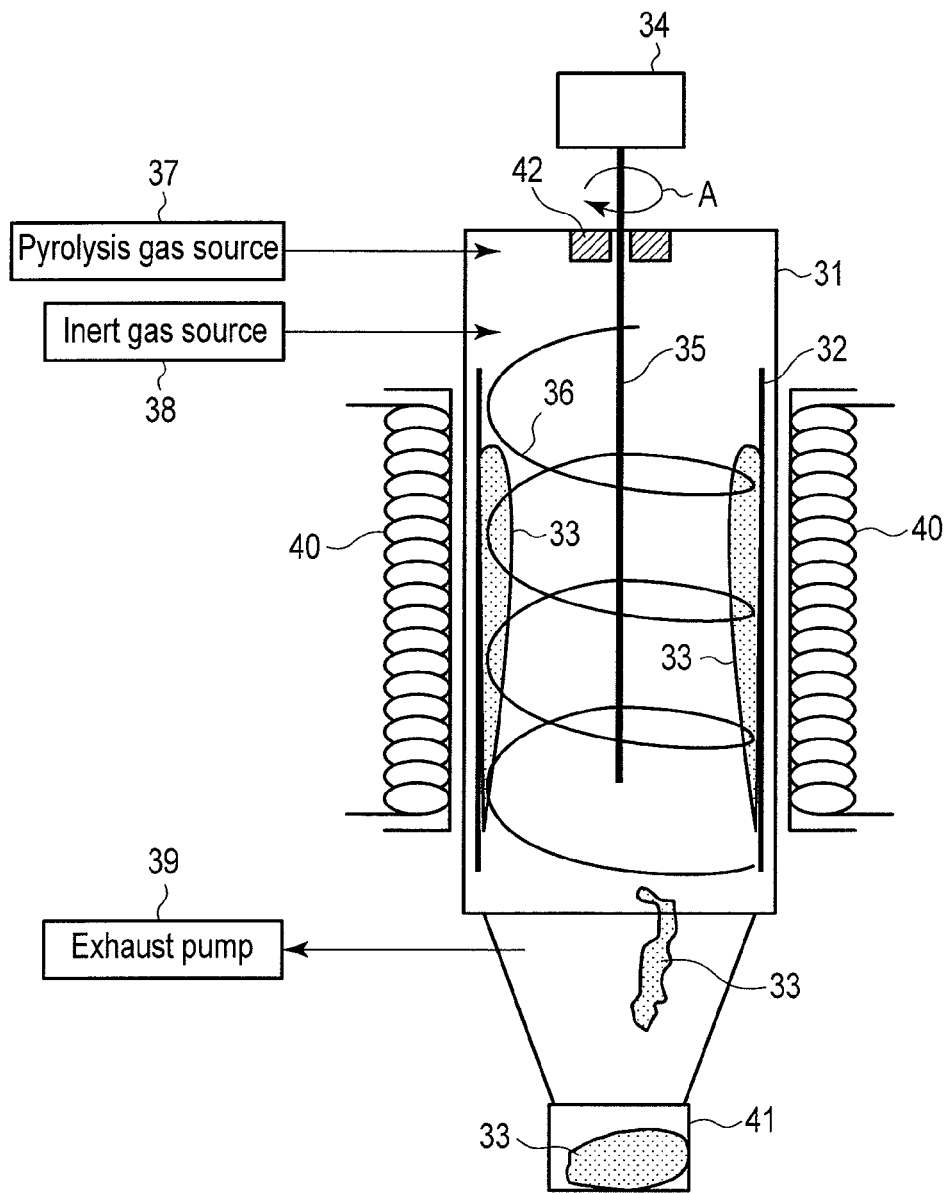
F I G. 3

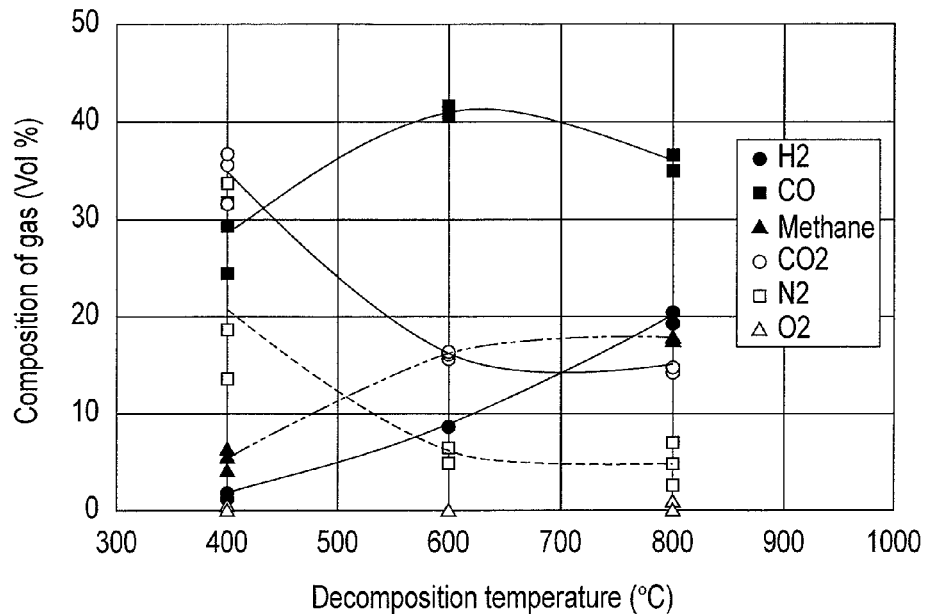
F I G. 4
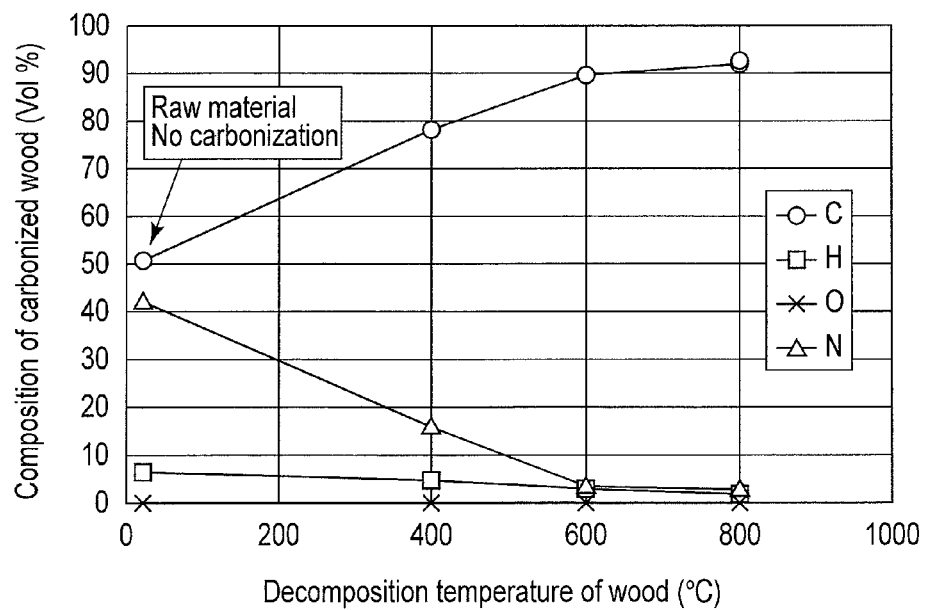
F I G. 5

`US 8,444,948 B2`

GRAPHITE NANO-CARBON FIBER AND METHOD OF PRODUCING THE SAME

CROSS-REFERENCE TO RELATED APPLICATIONS

This application is based upon and claims the benefit of priority from prior Japanese Patent Application No. 2011-033724, filed Feb. 18, 2011, the entire contents of which are incorporated herein by reference.

FIELD

Embodiments described herein relate generally to a graphite nano-carbon fiber using a wood material as raw material and a method of producing the same.

BACKGROUND

It is known to use, as a carbon nanostructure material, fibrous nano-carbon produced generally by bringing gas containing carbon into contact with a selected catalyst metal at a temperature of about 500° C. to 1200° C. for a prescribed period of time.

Examples of methods of producing a carbon nanostructure material include an ark discharge method, laser vapor deposition method, and chemical vapor deposition method (CVD method).

In the arc discharge method, arc discharge is made to generate between positive and negative graphite electrodes to thereby vaporize graphite, and a carbon nanotube is generated in a carbon deposit condensed at the tip of the negative electrode.

The laser vapor deposition method involves steps of adding a graphite sample mixed with a metal catalyst in inert gas heated to a high temperature and irradiating the graphite sample with a laser beam to thereby produce a carbon nanostructure material.

Although a carbon nanostructure material having high crystallinity can generally be generated in the arc discharge method and laser vapor deposition method, the amount of carbon to be generated is small and it is therefore said that these methods are scarcely applied to mass-production.

The CVD method is typified by two methods including a vapor deposition substrate method in which a carbon nanostructure material layer is formed on a substrate disposed in a reaction furnace and a fluidized vapor phase method in which a catalyst metal and a carbon source are fluidized together in a high-temperature furnace to synthesize a carbon nanostructure material.

However, the vapor deposition substrate method has a difficulty in attaining mass-production because it is carried out by batch treatment. Also, the direct injection pyrolytic method is inferior in temperature uniformity and is regarded as difficult to produce a carbon nanostructure material having high crystallinity. Moreover, a method modified from the fluidized vapor phase method is known in which a fluidized layer is formed in a high-temperature furnace from a fluidizing material also functioning as a catalyst and carbon raw material is supplied to the furnace to produce a fibrous carbon nanostructure material. This method is, however, inferior in temperature uniformity in the furnace so that it is assumed that this method has a difficulty in generating a carbon nanostructure material having high crystallinity.

The importance of nanostructure materials and particularly, graphite carbon nano-fibers has sharply increased in many industrial applications and studies as to the applications of these nanostructure materials are being made. Examples of these applications include occlusion and absorption/desorption of hydrogen, occlusion and absorption/desorption of lithium, catalytic action, and absorption and occlusion of nitrogen oxides. However, these nanostructure materials still have poor industrial applicability at present. One of the reasons is that structurally uniform graphite carbon nano-fibers cannot be mass-produced.

In light of this, if graphite carbon nano-fibers superior in the high stabilities of, for example, dimension, shape, structure and purity can be mass-produced efficiently at low cost, nano-technological products making use of the characteristics of these graphite carbon nano-fibers can be supplied in a large amount at low cost.

BRIEF DESCRIPTION OF THE DRAWINGS

FIG. 3 is a schematic view of an apparatus of producing a graphite nano-carbon fiber according to a second embodiment;

FIG. 4 is a characteristic diagram showing the relation between the decomposition temperature in a pyrolytic furnace shown in the production flow diagram of FIG. 1 and the gas composition of pyrolysis gas;

FIG. 5 is a characteristic diagram showing the relation between the decomposition temperature of a wood material in a pyrolytic furnace shown in the production flow diagram of FIG. 1 and the composition of carbide;

DETAILED DESCRIPTION

In general, according to one embodiment, there is provided a graphite nano-carbon fiber provided by using an apparatus having a reactor capable of keeping a reducing atmosphere inside thereof, a metal substrate arranged as a catalyst in the reactor, a heater heating the metal substrate, a pyrolysis gas source supplying pyrolysis gas obtained by thermally decomposing a wood material in a reducing atmosphere to the reactor, a scraper scraping carbon fibers produced on the metal substrate, a recovery container recovering the scraped carbon fibers, and an exhaust pump discharging exhaust gas from the reactor. The carbon fibers are linear carbon fibers with a diameter of 25 to 250 nm formed with layers of graphenes stacked in a longitudinal direction.

Hereinafter, graphite nano-carbon fibers according to embodiments will be described with reference to the drawings.

Figure 1:
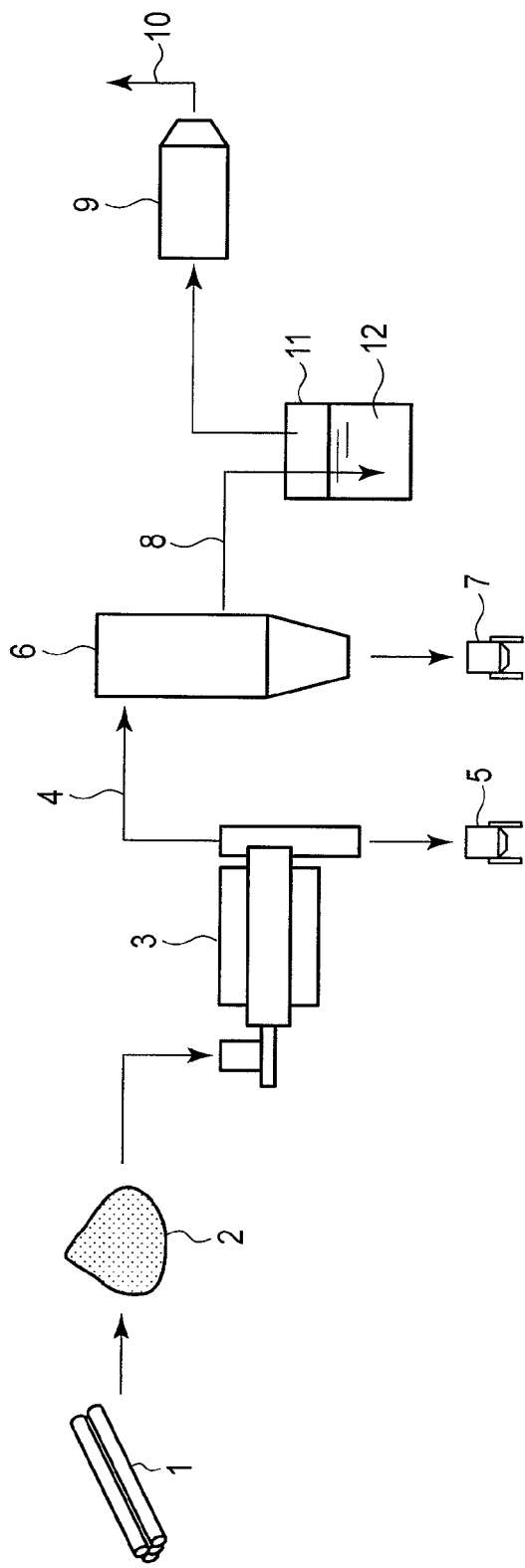
FIG. 1 is a schematic view of a production flow of a graphite nano-carbon fiber according to an embodiment.

FIG. 1 is a schematic view showing an example of a production flow of a graphite nano-carbon fiber.

First, a woody biomass resource 1 is crushed into chips 2. Next, the chips 2 are introduced into a pyrolytic furnace 3 that thermally decomposes the chips 2 in a reducing atmosphere while shutting off external air to separate a pyrolysis gas from a carbide 5. Here, a rotary kiln is used as the pyrolytic furnace 3. In succession, the pyrolysis gas 4 obtained from the pyrolytic furnace 3 is supplied to a fine carbon fiber generating furnace (reactor) 6 to generate fine carbon fibers 7. A surplus gas (off-gas) 8 left in the fine carbon fiber generating furnace is burned in an off-gas combustion furnace 9 into an exhaust gas 10. A surplus gas pipe line is configured to sink the inlet side pipe in a seal solution 12 stored in a liquid seal container 11 to thereby prevent surplus gas from flowing backward.

First Embodiment

An apparatus of producing a graphite nano-carbon fiber according to a first embodiment will be described with reference to FIG. 2. Here, FIG. 2 corresponds to the generating furnace of FIG. 1.

A metal substrate (catalyst) 22 and a scraper 24 that scrapes fine carbon fibers 23 generated on the metal substrate 22 are arranged in the reactor 21 capable of keeping a reducing atmosphere inside thereof. A pyrolysis gas source 25 that supplies pyrolysis gas of a wood material to the reactor 21 is communicated with the reactor 21. A heater 26 that heats the metal substrate 22 in the reactor 21, a recovery container 27 that recovers the fine carbon fibers 23 and an exhaust pump 28 that discharges exhaust gas from the reactor 21 are arranged on the outside of the reactor 21.

In the first embodiment, a nickel metal which is most compatible with the pyrolysis gas of a wood material is used as the metal substrate 22. Because an oxide film is generally formed on the surface of the metal substrate used as a catalyst, the film is removed to activate the surface. As the activating method, the surface is polished and treated with an acid.

Figure 2:
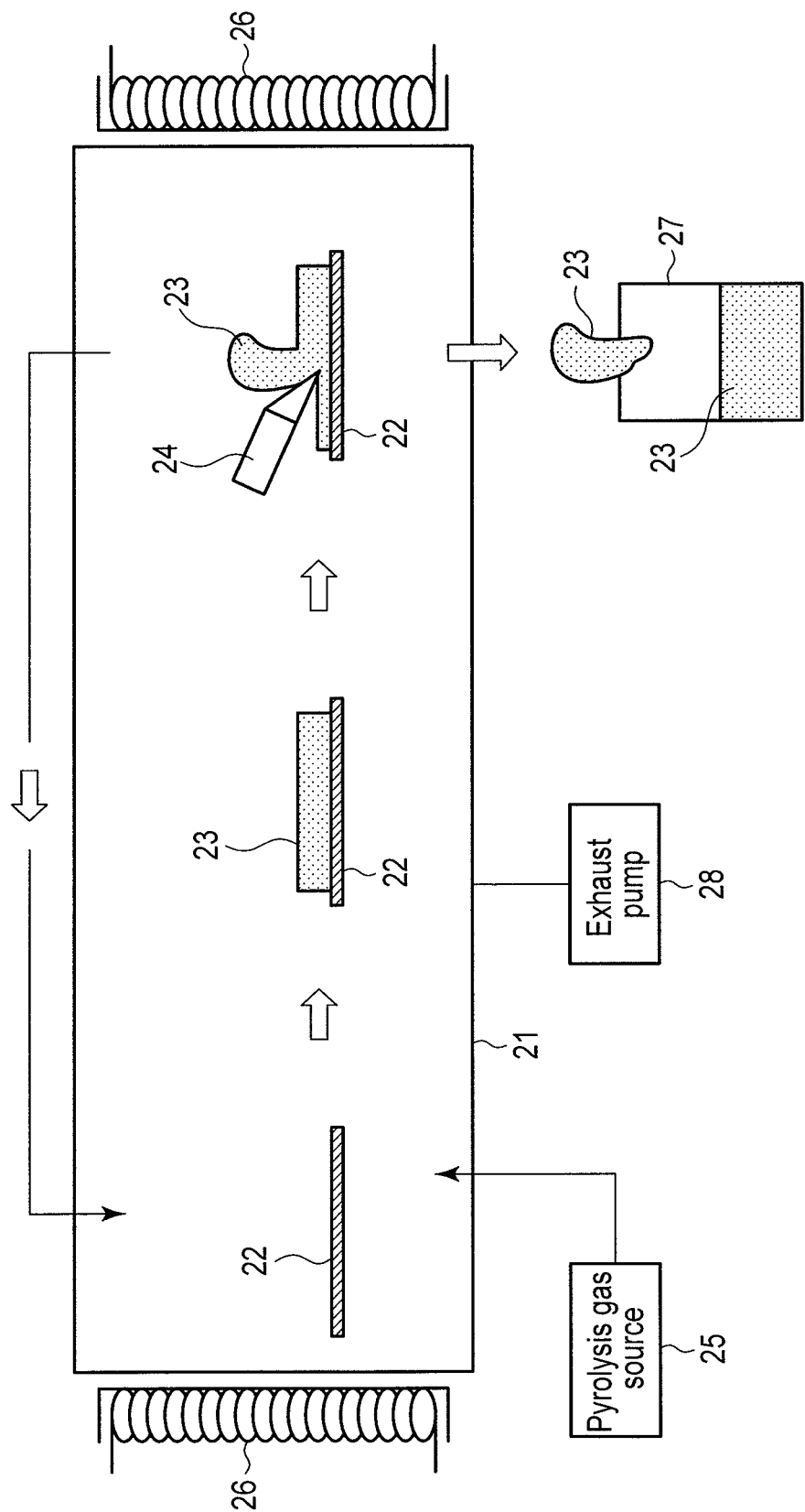
FIG. 2 is a schematic view of a reactor of an apparatus of producing a graphite nano-carbon fiber according to a first embodiment.

The followings describe the action of the production apparatus of FIG. 2.

First, the temperature of the reactor 21 is adjusted to 680° C. to 780° C. and preferably 740° C., and the pyrolysis gas is supplied to the reactor 21. At this time, carbon atoms are incorporated into the metal substrate 22 in the reactor. Next, when carbon on the metal substrate 22 is saturated, carbon precipitates on the metal substrate 22 and is grown into a crystal form. The matters grown into crystals are the fine carbon fibers 3.

Next, the fine carbon fibers 23 grown on the metal substrate 22 over several tens of minutes are scraped with the scraper 24 and recovered in the recovery container 27 outside of the reactor. In scraping, the fibers are scraped in such a manner that the fibers having a thickness of about 0 to 5 mm are left on the metal substrate 22 and then, the fine carbon fibers 23 grown again are scraped and these operations are repeated. Even if the fine carbon fibers left unscraped exist on the metal substrate 22, the amount of the fine carbon fibers to be generated is not reduced but can be kept constant for a long time because carbon is sufficiently supplied to the metal catalyst.

Second Embodiment

An apparatus of producing a graphite nano-carbon fiber according to a second embodiment will be described with reference to FIG. 3. Here, FIG. 3 corresponds to the generating furnace of FIG. 1.

A cylindrical metal substrate (catalyst) 32 is disposed inside of a vertical cylindrical reactor 31 which can shut off external air and keep a reducing atmosphere inside thereof, and is arranged coaxially with the reactor 31. In the reactor 31, a scraper that scrapes fine carbon fibers 33 generated on the surface of the metal substrate 32 is arranged. Here, the scraper is constituted by a driving unit 34, a main shaft 35 which is axially supported by the driving unit 34 in such a manner as to be rotatable in the direction of the arrow A, and a spiral scraping rotary blade 36 attached to the main shaft 35. A pyrolysis gas source 37 that supplies pyrolysis gas of a wood material to the reactor, an inert gas source 38 that supplies hydrogen and inert gas to the reactor, and an exhaust pump 39 that discharges gas from the reactor are connected with the reactor 31. A heater 40 that heats the metal substrate 32 is arranged around the outside periphery of the reactor 31. A recovery container 41 that recovers the scraped fine carbon fibers 33 is connected with the lower part of the reactor 31. The numeral 42 in FIG. 3 represents a seal member disposed around the main shaft 35 on the upper part of the reactor 31.

In the second embodiment, a nickel metal which is most compatible with the pyrolysis gas of a wood material is used as the metal substrate 32. Because an oxide film is generally formed on the surface of the metal substrate used as a catalyst, the film is removed to activate the surface. As the activating method, the surface is polished and treated with an acid. The cylindrical metal substrate 32 which serves as the catalyst is configured to be replaceable with a new one after a prescribed period of time, because it is reduced in wall thickness in the course of synthesis of carbon fibers.

The followings describe the action of the production apparatus of FIG. 3.

First, the temperature of the reactor 31 is adjusted to 680° C. to 780° C. and preferably 740° C. and pyrolysis gas is supplied to the reactor 31. At this time, carbon atoms are incorporated into the metal substrate 32. Next, when carbon on the metal substrate 32 is saturated, carbon precipitates on the metal substrate 32 and is grown into a crystal form. The matters grown into crystals are the fine carbon fibers 3.

Next, the fine carbon fibers 33 grown on the metal substrate 32 over several tens of minutes are scraped with the rotary blade 36 and recovered in the recovery container 41 disposed on the lower part of the reactor 31. In scraping, the distance between the metal substrate 32 and the tip of rotary blade 36 is adjusted in such a manner that the fibers having a thickness of about 0 to 5 mm are left on the metal substrate 32. Also, the rotary blade 36 is rotated at a rate of 0.01 to 0.05 rpm by the driving unit 34 to scrape fibers continuously or intermittently at intervals of 20 to 60 min. As a result, the fine carbon fibers 33 are scraped, and then, the fine carbon fibers 33 grown again are scraped again, thereby enabling continuous production. Even if the fine carbon fibers left unscraped exist, the amount of the fine carbon fibers to be generated is not reduced but can be kept constant for a long time because carbon is sufficiently supplied to the metal substrate 32.

The followings describe the action of the above embodiment in detail.

FIG. 4 is a view showing the results of analysis of the gas composition of the pyrolysis gas 4 comes from the pyrolytic furnace 3 of FIG. 1. When the decomposition temperature is 600° C. or more, the amounts of CO (carbon monoxide), $CH_4$ (methane), $CO_2$ (carbon dioxide), and $N_2$ (nitrogen) which are major components of the pyrolysis gas become almost constant and $H_2$ (hydrogen) tends to be increased with increase in decomposition temperature.

FIG. 5 is a view showing the results of analysis of the composition of the carbide 5 comes from the pyrolytic furnace 3 of FIG. 1. When the decomposition temperature is 600° C. or more, the amounts of C (carbon), H (hydrogen), O (oxygen) and N (nitrogen) which are major components of the pyrolysis gas become almost constant. The following Table 1 shows the relations between the decomposition temperature, moisture content, content of volatile components, ash content, fixed carbon, higher caloric value, lower caloric value, or each content of C, H, O, or N, and a wood material or carbide A, B, C, or D.

TABLE 1

|  | Woody material | Carbide A | Carbide B | Carbide C | Carbide D |
|---|---|---|---|---|---|
| Decomposition temperature (° C.) | — | 400 | 600 | 800 | 800 |
| Moisture content (%) | 5.0 | 0.3 | 1.7 | 0.8 | <0.01 |
| Volatile component (%) | 81.5 | 31.82 | 10.9 | 5.01 | 4.23 |
| Ash content (%) | 5.0 | 1.0 | 1.5 | 2.8 | 2.9 |
| Fixed carbon (%) | 18.7 | 66.8 | 85.9 | 91.4 | 92.9 |
| Higher caloric value (kJ/kg) | 19700 | 30200 | 33500 | 32800 | 32900 |
| Lower caloric value (kJ/kg) | 18300 | 29200 | 32800 | 32400 | 32600 |
| C (Vol %) | 50.8 | 78.1 | 89.7 | 91.8 | 92.7 |
| H (Vol %) | 6.1 | 4.4 | 3.0 | 1.4 | 1.4 |
| O (Vol %) | 0.08 | 0.12 | 0.16 | 0.12 | 0.12 |
| N (Vol %) | 42.6 | 16.0 | 3.9 | 3.0 | 2.0 |

From the results of the compositions of the pyrolysis gas and carbides shown in FIGS. 4 and 5, it is found that pyrolysis gas is stably obtained at a temperature ranging from 600° C. to 800° C. as a raw material gas for producing fine carbon fibers.

The above descriptions are relating to the apparatus and method of producing fine carbon fibers, and then, the followings describe the dimension, shape, structure and purity of the generated fine carbon fibers.

Figure 6:
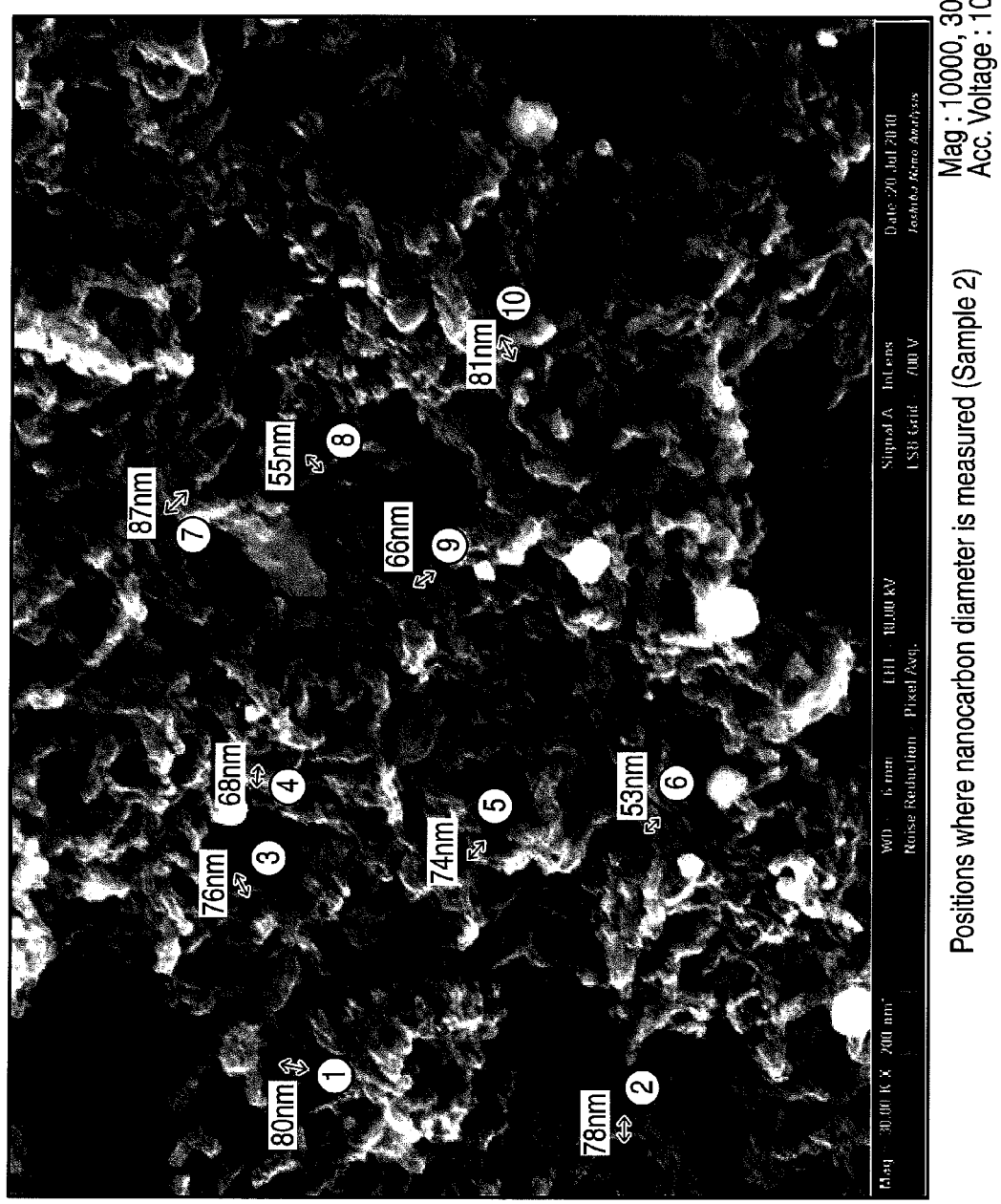
FIG. 6 is an electron microphotograph showing positions where the diameter of a fine carbon fiber according to an embodiment is measured and the measured values.

FIG. 6 is an electron microphotograph showing positions where the diameter of fine carbon fibers of a sample 2 which will be described later is measured and the measured values. Matters seen like twisted fibers are fine carbon fibers. The distribution of diameters measured at many points represented in FIG. 6 is shown in the following Tables 2 to 6. The symbol in each parenthesis in the column of Samples indicates raw data obtained with an actual machine. In Tables 2 to 6, the diameters of the fine carbon fibers are measured by the method shown in FIG. 6, and data of 18 samples are collected. In this case, the samples 1 and 2 in Table 2 correspond to dry wood material, the samples 3 and 4 in Table 2, the samples 5 to 8 in Table 3 correspond to non-dry wood material, and the samples 9 and 10 in Table 4 correspond to dry wood in which the scraping intervals are changed.

Also, with regard to the samples 1 to 10, the temperature of the reactor was set to 740° C. and the flow rate of pyrolytic gas of the wood material was set to 2.3 kg/h. Moreover, the samples 11 and 12 in Table 4, the samples 13 to 16 in Table 5 and the samples 17 and 18 in Table 6 correspond to dry wood material, the flow rate (Q) being set to 3.27 kg/h for the samples 11 and 12, to 4.31 kg/h for the samples 13 and 14, to 5.04 kg/h for the samples 15 and 16, and to 6.63 kg/h for the samples 17 and 18. Also, with regard to the samples 11 to 18, the temperature of the reactor was set to 740° C.

TABLE 2

| [nm] | Sample 1 (HT100611-1) | Sample 2 (HT100611-2) | Sample 3 (HT100615-1) | Sample 4 (HT100615-2) |
|---|---|---|---|---|
| 500~ | | | | |
| 475~650 | | | | |
| 450~600 | | | | |
| 425~450 | | | | |
| 400~425 | | | | |
| 375~400 | | | | |
| 350~375 | | | | |
| 325~350 | | | | |
| 300~325 | | | | |
| 275~300 | | | | |
| 250~275 | | | | |
| 225~250 | xx | | | |
| 200~225 | | xx | | |
| 175~200 | xx | x | x | xx |
| 150~175 | xxxx | xxxx | x | xx |
| 125~150 | xxx | x | xxx | xxxxx |
| 100~125 | xxxxxxxx | xxxxx | xxxxxxx | xxxxxxxxx |
| 75~100 | xxxxxxxxxxxx | xxxxxxxxxxxxxx | xxxxxxxx | xxxxxxxxxxxxxx |
| 50~75 | xxxxxxx | xxxxxxxxxxxx | xxxxxxxxxxxxxx | xxxxxx |
| 25~50 | | | xxxxxx | xx |
| ~25 | | | | |
| Average | 110.8 | 100.4 | 84.4 | 101.6 |
| σ | 43.1 | 40.4 | 35.2 | 35.3 |
| Max | 231 | 206 | 187 | 199 |
| Min | 59 | 53 | 38 | 46 |

TABLE 3

| [nm] | Sample 5 (HT100616-1) | Sample 6 (HT100616-2) | Sample 7 (HT100617-1) | Sample 8 (HT100617-2) |
|---|---|---|---|---|
| 500~ | | | | |
| 475~650 | | | | |
| 450~600 | | | | |
| 425~450 | | | | |
| 400~425 | | | | |
| 375~400 | | | | |
| 350~375 | | | | |
| 325~350 | | | | |
| 300~325 | | | | |
| 275~300 | | | | |
| 250~275 | | | | |
| 225~250 | | | | x |
| 200~225 | | | | |
| 175~200 | xx | xx | x | xx |
| 150~175 | xxxx | xxxx | x | x |
| 125~150 | xx | xxxxxx | xxxxxx | xxxxxx |
| 100~125 | xxxxxxxx | xxxxxxxxx | xxxxxxxxx | xxxxxxxxxxxxxxx |
| 75~100 | xxxxxxxxxxxxxx | xxxxxxxxxxxxx | xxxxxxxxxxxxxxxx | xxxxxxxx |
| 50~75 | xxxxxxxx | xxxxx | xxxxx | xxxxx |
| 25~50 | | | x | |
| ~25 | | | | x |
| Average | 101.8 | 109.5 | 106.4 | 109.5 |
| σ | 34.8 | 34.2 | 39.6 | 41.0 |
| Max | 187 | 191 | 279 | 233 |
| Min | 55 | 56 | 49 | 2 |

TABLE 4

| [nm] | Sample 9 (HT100623-1) | Sample 10 (HT100623-2) | Sample 11 (HT100624-1) | Sample 12 (HT100624-2) |
|---|---|---|---|---|
| 500~ | | | | |
| 475~650 | | | | |
| 450~600 | | | | |
| 425~450 | | | | |
| 400~425 | | | | |
| 375~400 | | | | |
| 350~375 | | | | |
| 325~350 | | | | |
| 300~325 | | | | |
| 275~300 | | | | |
| 250~275 | | | | |
| 225~250 | | | | x |
| 200~225 | | | | x |
| 175~200 | x | | xx | x |
| 150~175 | xxxxx | x | xxxxx | x |
| 125~150 | xxxxx | xxxxx | xxxxx | xxxxx |
| 100~125 | xxxxxxxxx | xxxxxxxxx | xxx | xxxxxxxxx |
| 75~100 | xxxxxxxx | xxxxxxxxxxxxxx | xxxxxxxxxxxxxx | xxxxxxxxxxxxxxxxxxxx |
| 50~75 | xxxxxxxxx | xxxxxxxxx | xxxxxxxxx | x |
| 25~50 | | | | |
| ~25 | | | | |
| Average | 104.6 | 97.0 | 102.6 | 109.2 |
| σ | 33.3 | 26.5 | 38.1 | 29.4 |
| Max | 177 | 152 | 192 | 212 |
| Min | 53 | 52 | 57 | 75 |

TABLE 5

| [nm] | Sample 13 (HT100625-1) | Sample 14 (HT100625-2) | Sample 15 (HT100629-1) | Sample 16 (HT100629-2) |
|---|---|---|---|---|
| 500~ | | | | |
| 475~650 | | | | |
| 450~600 | | | | |
| 425~450 | | | | |
| 400~425 | | | | |
| 375~400 | | | | |
| 350~375 | | | | |
| 325~350 | | | | |
| 300~325 | | | | |
| 275~300 | | | | |

TABLE 5-continued

| [nm] | Sample 13 (HT100625-1) | Sample 14 (HT100625-2) | Sample 15 (HT100629-1) | Sample 16 (HT100629-2) |
|---|---|---|---|---|
| 250~275 | | | | |
| 225~250 | x | | | |
| 200~225 | | xxx | | |
| 175~200 | xx | | x | |
| 150~175 | x | | xxxx | xx |
| 125~150 | xxxxxxxx | xx | xxxx | xxxxx |
| 100~125 | xxxxxxx | xxxxxxxxxx | xxxxxxx | xxxxxxxxxxxxxx |
| 75~100 | xxxxxxxx | xxxxxxxxxxxxxxxxx | xxxxxxxxxx | xxxxxxx |
| 50~75 | xxxxxxxxxxx | xxxxxx | xxxxxxxxxx | xxxxxxx |
| 25~50 | | xx | xxx | xxxxx |
| ~25 | | | | |
| Average | 106.2 | 101.7 | 97.9 | 96.9 |
| σ | 40.3 | 40.2 | 39.1 | 31.4 |
| Max | 243 | 225 | 191 | 159 |
| Min | 52 | 37 | 35 | 37 |

TABLE 6

| [nm] | Sample 17 (HT100630-1) | Sample 18 (HT100630-2) |
|---|---|---|
| 500~ | | |
| 475~650 | | |
| 450~600 | | |
| 425~450 | | |
| 400~425 | | |
| 375~400 | | |
| 350~375 | | |
| 325~350 | | |
| 300~325 | | |
| 275~300 | | |
| 250~275 | | |
| 225~250 | | |
| 200~225 | | xx |
| 175~200 | | xx |
| 150~175 | xx | xxx |
| 125~150 | xxxxxxx | xxxxxx |
| 100~125 | xxxxxxx | xxxxxxxxxx |
| 75~100 | xxxxxxxxxxxxxxxx | xxxxxxx |
| 50~75 | xxxxxxx | xxxxxxx |
| 25~50 | | xx |
| ~25 | | x |
| Average | 101.2 | 108.4 |
| σ | 26.1 | 45.2 |
| Max | 153 | 208 |
| Min | 53 | 9 |

Actual data shown in Tables 2 to 6 show a diameter distribution with a primary diameter ranging from 25 to 250 nm. The average diameter is 84.4 to 110.8 nm, and a modal value of diameter is about 100 nm.

The following Table 7 shows the results of the specific surface areas and bulk densities of the (gas adsorption BET method), and the specific surface area including the data of other samples was 50 to 220 m²/g and preferably 170 to 210 m²/g.

Also, the bulk density (volumetric method) was 0.47 to 0.50 g/cm³, and the bulk density including the data of other samples was 0.35 to 0.60 g/cm³ and preferably 0.4 to 0.5 g/cm³.

TABLE 7

| Measuring items | Measuring method | Sample 2 | Sample 8 | Sample 18 |
|---|---|---|---|---|
| Specific surface area (m²/g) | Gas adsorption BET method | 203.7 | 213.7 | 209.9 |
| Bulk density (g/cm³) | Volumetric method | 0.50 | 0.47 | 0.47 |

[Specific surface area: BET method]

Glass volume: 5 mL

Amount of a sample: 2.5 mL

Deaerating temperature: 200° C.

Deaerating time: 30 min

Operating unit: trade name: HM model-1208, manufactured by Mountech Co., Ltd.

[Measurement of bulk density]

Volume of a measuring container: 25 mL

Tap height: 10 mm

Number of taps: 1000

Operating unit: trade name: TAPDENSER KYT-3000 manufactured by SEISHIN ENTERPRISE CO., LTD.

Figure 7:
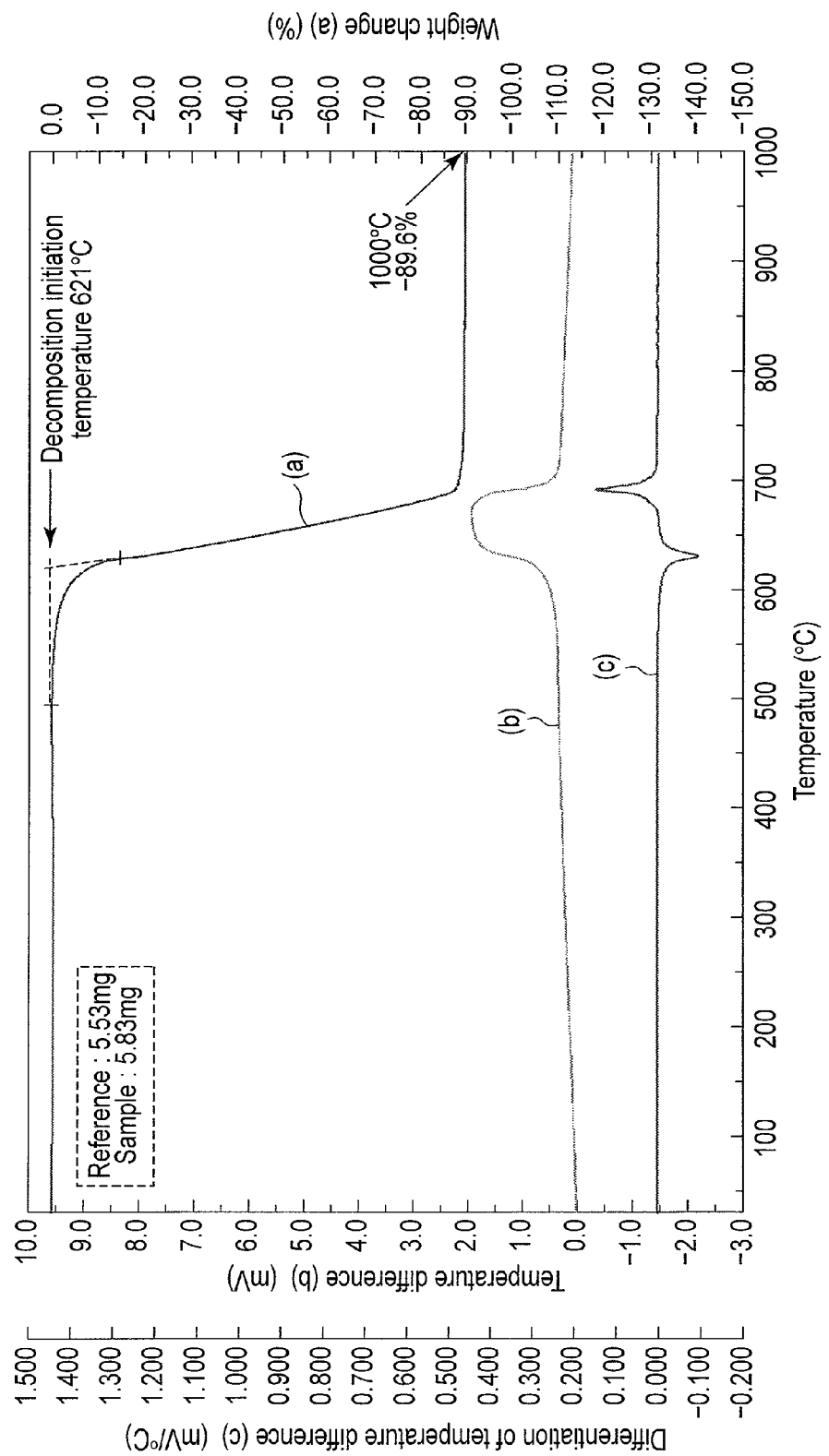
FIG. 7 is a characteristic diagram showing the relations between the temperature, and temperature difference, differentiation of the temperature difference or variation in the weight of a fine carbon fiber according to an embodiment.

FIG. 7 is a characteristic diagram showing the relations between the temperature, and temperature difference, differential calculus of the temperature difference (variation as a function of time) or variation in the weight of the fine carbon fibers of the sample 2. In FIG. 7, (a) is a curve showing a variation in the weight (TG) of fine carbon fibers when the carbon fibers are heated, (b) is a curve showing a difference in the temperature (DTA) between a sample and a standard material when they are heated, and (c) is a curve showing a variation with time in temperature difference (DDTA) detected by a differential thermocouple. It is found from FIG. 7 that the decomposition initiation temperature (heat resistant temperature) is 621° C. and the ratio of weight reduction is 89.6% (1000° C.).

The results of three samples measured by this method are shown in the following Table 8. Table 8 shows the distribution of the decomposition initiation temperature (heat resistant temperature) ranging from 603° C. to 621° C. Also, the heat resistant temperature including the data of other samples is 530° C. to 630° C. and is preferably 600° C. to 620° C. Moreover, from Table 8, the rate of weight reduction (purity) is about 87% or more. Also, the rate of weight reduction including the data of other samples is 75 to 97% and is preferably 84 to 97%. The residues are components not combusted at 1000° C. and are assumed to be, for example, the catalyst.

TABLE 8

| Sample Name | Content of samples | Measurement | Decomposition initiation temperature (° C.) | Rate of weight reduction at temperature up to 1000° C. (%) | Color of residues |
|---|---|---|---|---|---|
| Sample 2 | Dry woody material Test 2 | n = 1 | 621 | 89.6 | Milky |
| | | n = 2 | 619 | 88.7 | |
| Sample 8 | Non-dry woody material Test 3 | n = 1 | 616 | 92.5 | Milky |
| | | n = 2 | 616 | 89.0 | |
| Sample 18 | Variation Test 4 | n = 1 | 603 | 87.8 | Milky |
| | | n = 2 | 606 | 91.4 | |

Figure 8:
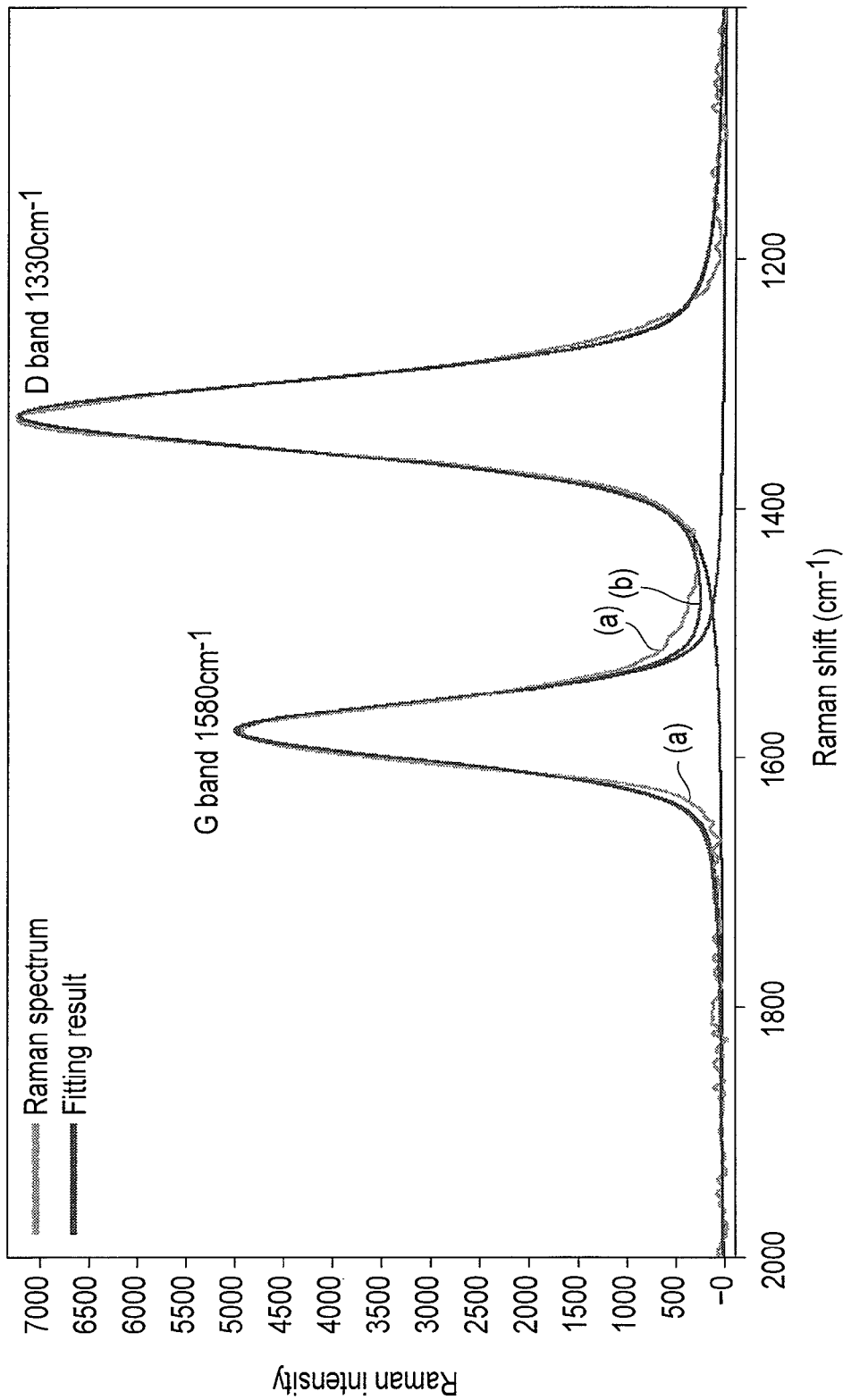
FIG. 8 is a characteristic view showing the relation between the Raman shift and Raman intensity of a fine carbon fiber according to an embodiment.

FIG. 8 shows the relation between the Raman shift and Raman intensity of the fine carbon fibers of the sample 2. In FIG. 8, (a) is a curve showing the Raman spectrum, and (b) shows the result of fitting. A G-band (1580 cm$^{-1}$) of a graphite structure and a D-band (1330 cm$^{-1}$) derived from the defect of the graphite structure appear. The following Table 9 shows each Raman spectrum of three samples 2, 8 and 18, where IG/ID values are 0.7, 0.8, and 0.5, respectively. At this time, IG and ID are heights of the X-axis center values of the G-band and D-band, respectively. Also, IG/ID values including the data of other samples are 0.5 to 1.3 and preferably 0.5 to 0.9.

TABLE 9

| Sample Name | Peak | X center value | Height | Half value width | Area | IG/ID * |
|---|---|---|---|---|---|---|
| Sample 2 | D-band | 1326 | 7217 | 67 | 612506 | 0.7 |
| | G-band | 1579 | 4960 | 58 | 350772 | |
| Sample 8 | D-band | 1322 | 7560 | 72 | 672366 | 0.8 |
| | G-band | 1578 | 5893 | 57 | 420575 | |
| Sample 18 | D-band | 1324 | 6987 | 63 | 564815 | 0.5 |
| | G-band | 1575 | 3675 | 60 | 253813 | |

Figure 9:
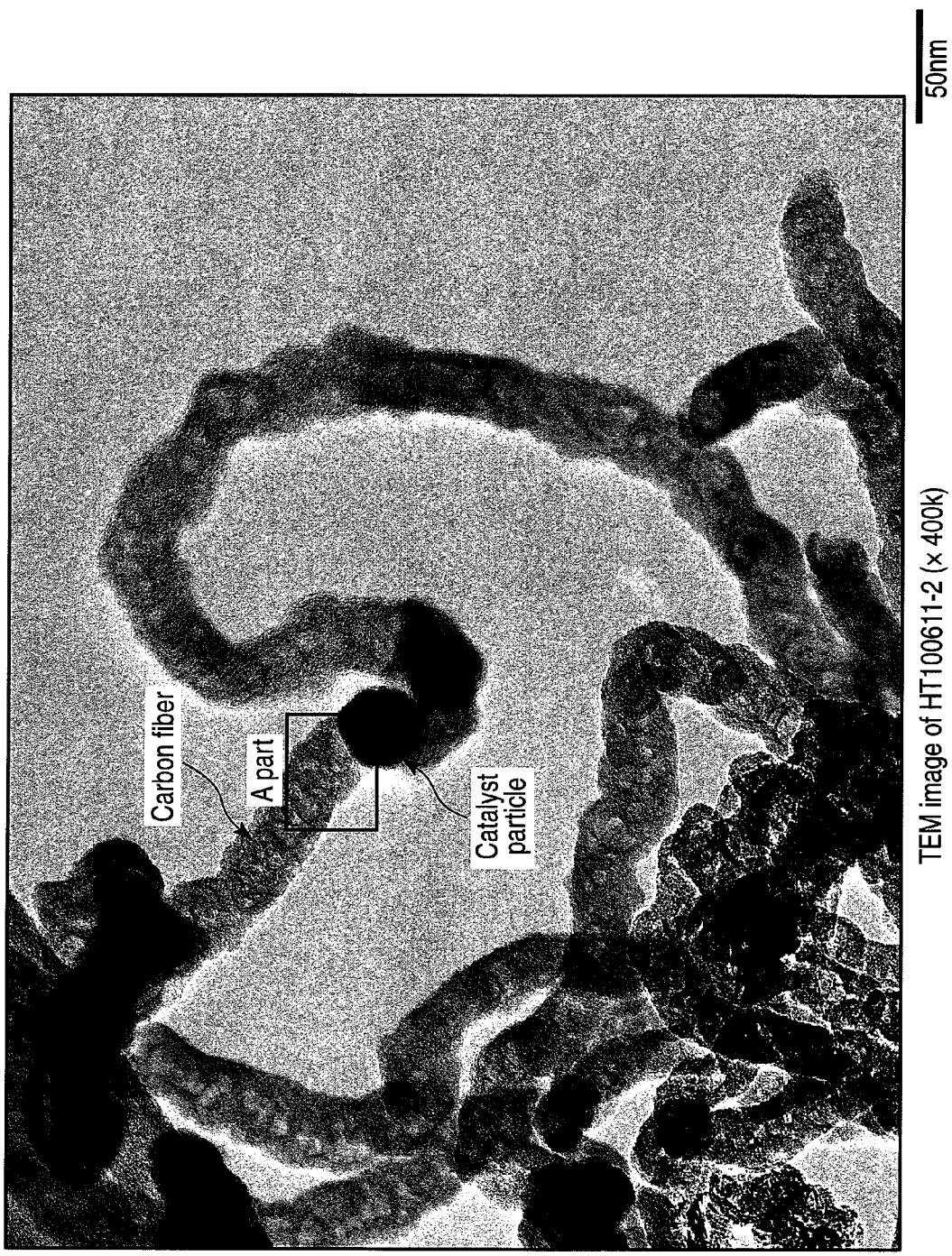
FIG. 9 is a transmission electron microphotograph of a fine carbon fiber according to an embodiment.
Figure 10:
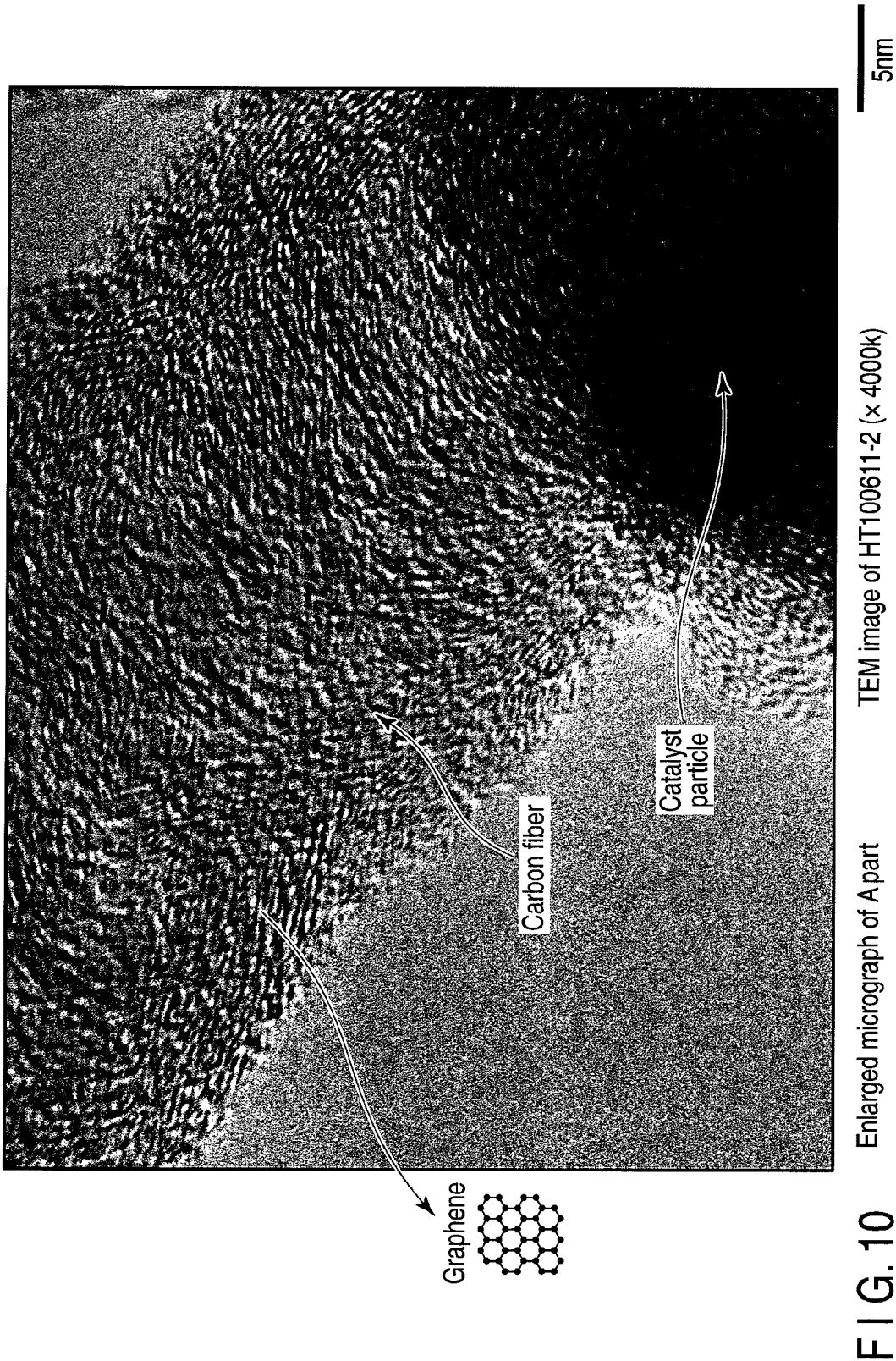
FIG. 10 is an electron microphotograph of enlarged part A of a fine carbon fiber in FIG. 9.

* Ratio of peak heights of G-band and D-band
G-band: Crystalline carbon
D-band: Amorphous carbon including defects FIG. 9 is a transmission electron microphotograph of fine carbon fibers. It is found that carbon fibers are grown on both sides of the catalyst microparticle. Also, FIG. 10 is a microphotograph of enlarged part A enclosed by the square (□) in FIG. 9. It is found from FIG. 10 that the fine carbon fiber has a structure in which crystallized graphene pieces are stacked.

From the above fact, it was found that the fine carbon fibers produced by the apparatus of the present embodiment were linear graphite nano-carbon fibers (GNF) which have a diameter of 25 to 250 nm and in which layers of graphenes were stacked in a longitudinal direction. Further analysis of the fine carbon fibers revealed that the distance between graphenes was 0.3 to 0.4 nm, these layers of graphenes were stacked to constitute a crystallite having an average crystal thickness of 3 to 10 nm and these crystallites are stacked, thereby constituting linear graphite nano-carbon fibers having a diameter of 25 to 250 nm.

Figure 11B:
FIG. 11A, FIG. 11B, FIG. 11C and FIG. 11D are views schematically illustrating the structure of fine carbon fibers according to an embodiment.
Figure 11C:
Figure 11D:
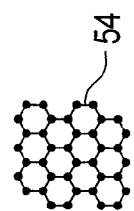
Figure 11A:
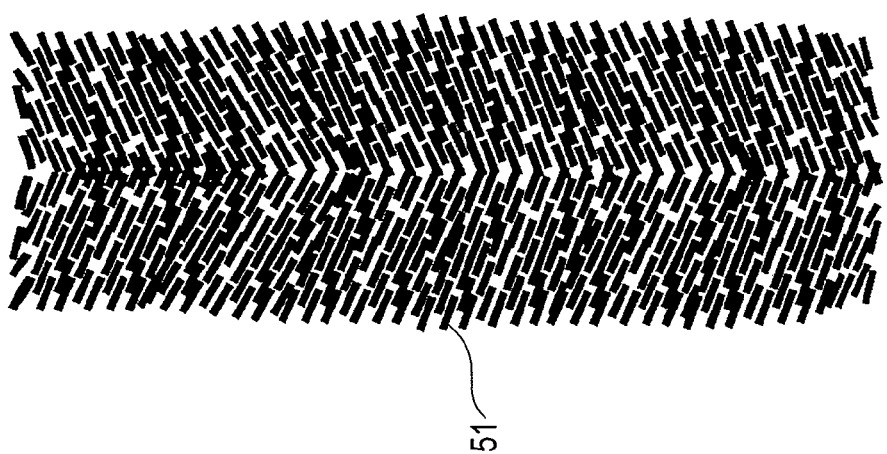

FIGS. 11A to 11D are views schematically illustrating the structure of the linear graphite nano-carbon fibers. FIG. 11A is a section of a graphite nano-carbon fiber 51 having an almost circular form, FIG. 11B is a section of a graphene block (crystallite) 52, FIG. 11C is a section of a graphene dispersed piece 53, and FIG. 11D shows a graphene 54.

In the production apparatus according to the present embodiment, fine carbon fibers are grown on the metal substrate and therefore, the metal substrate is transferred to the fine carbon fiber to a minimal extent, so that the fine carbon fibers have very high purity. Also, the production apparatus enables continuous production and can therefore attain mass production, bringing about the possibility of industrial distribution.

Further, the fine carbon fibers produced in the present embodiment are expected to be dispersed with a smaller graphene shape due to its structure. The fine carbon fibers may be expected to be used in new applications such as electronic parts utilizing a high level of photoelectron mobility, chemical sensors and hydrogen storage materials utilizing chemical sensitivity and chemical reaction, mechanical sensors utilizing a high level of mechanical strength, laser parts and transparent electrodes utilizing light transmittance and electroconductivity and wiring materials utilizing high-current density resistance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of producing a graphite nano-carbon fiber, the method comprising:
   providing a metal substrate in the a reactor, the metal substrate capable of acting as a catalyst;
   supplying a reducing atmosphere and a pyrolysis gas obtained by thermally decomposing a wood material in to the reactor;
   heating the metal substrate with the pyrolysis gas of the wood material to deposit carbon fibers on the metal substrate;
   scraping carbon fibers on the metal substrate;
   recovering the scraped carbon fibers; and
   discharging exhaust gas from the reactor,
   wherein the graphite nano-carbon fibers comprise linear carbon fibers having a diameter of 25 to 250 nm, with layers of graphenes stacked in a longitudinal direction.

2. The method of claim 1, wherein the graphite nano-carbon fiber is produced by using an apparatus comprising: a cylindrical reactor configured to contain a reducing atmosphere; a cylindrical metal substrate in the reactor, the metal substrate being coaxial with the reactor and configured to act as a catalyst; a heater configured to heat the metal substrate; a pyrolysis gas source configured to supply pyrolysis gas to the reactor; a scraper comprising a spiral scraping blade configured to scrape carbon fibers on an inside wall of the metal substrate; a recovery container configured to recover the scraped carbon fibers; and an exhaust pump configured to discharge exhaust gas from the reactor.

3. The method of claim 1, wherein the fiber has a specific surface area of 50 to 220 m2/g when measured by a gas adsorption BET method.

4. The method of claim 1, wherein the fiber has a bulk density of 0.35 to 0.60 g/cm$^3$.

5. The method of claim 1, wherein the fiber has a heat resistant temperature of 530 to 630° C.

6. The method of claim 1, wherein the fiber has a purity of 75 to 97%.

7. The method of claim 1, wherein a ratio of crystalline carbon to amorphous carbon in the fiber is between 0.5 and 1.3, inclusive.

* * * * *